United States Patent [19]

Brenneman

[11] Patent Number: 4,703,660
[45] Date of Patent: Nov. 3, 1987

[54] APPARATUS AND METHOD FOR CONTINUOUSLY MEASURING MASS FLOW

[75] Inventor: Benjamin Brenneman, Lynchburg, Va.

[73] Assignee: The Babcock & Wilcox Company, New Orleans, La.

[21] Appl. No.: 846,777

[22] Filed: Apr. 1, 1986

[51] Int. Cl.⁴ .............................................. G01F 1/84
[52] U.S. Cl. .................................................. 73/861.38
[58] Field of Search ............ 73/861.36, 861.37, 861.38

[56]  References Cited
FOREIGN PATENT DOCUMENTS 0119638  9/1984  European Pat. Off. .......... 73/861.38
0206926 12/1983  Japan .

Primary Examiner—Herbert Goldstein
Attorney, Agent, or Firm—Robert J. Edwards; Vytas R. Matas

[57] ABSTRACT

A method and apparatus for measuring mass flow of a fluid flow in a conduit includes separating the flow into two separate conduits or tubes. The two tubes are oscillated at oscillation portions one portion being 180° out of phase with the other. The oscillation portions are located on each side of midpoints of respective tubes. Velocity, distance, acceleration and phase of oscillation of the midpoints or sensing location near the midpoints of the tubes is measured which measurement corresponds to the mass flow rate of the fluid flow.

6 Claims, 5 Drawing Figures

APPARATUS AND METHOD FOR CONTINUOUSLY MEASURING MASS FLOW

FIELD AND BACKGROUND OF THE INVENTION

The present invention relates in general to mass flow measuring techniques and, in particular to a new and useful apparatus and method of measuring mass flow rate of the fluid utilizing two spaced apart tubes each meant for carrying about one half of the flow, which tubes are forced to oscillate between fixed points in order to impart a reciprocating angular rotation to the tubes.

Devices are known which utilize the effect of angular motion on a moving field to directly measure mass flow. See for example, U.S. Pat. No. 2,865,201 issued Dec. 23, 1958 to Roth and U.S. Pat. No. 3,355,944 issued Dec. 5, 1967 and 3,485,098 issued Dec. 23, 1969 to Sipin.

U.S. Pat. No. 4,109,524 issued Aug. 29, 1978 to Smith, discloses an apparatus and method for measuring mass flow rate through a conduit by reciprocating a section of the conduit to produce longitudinal angular rotation of that section. Linkages are connected to the section both for reciprocating it and for measuring a force exerted on the section which force is due to an apparent force produced by mass flow through the conduit section. A direct measurement can thus be taken of the mass flow rate in this manner.

To understand how mass flow rate can be measured using the effects of this force, reference is now made to FIG. 1 which shows an arrangement of vectors on an X, Y, coordinate system.

In order for a mass (m), which is moving with velocity (v), to maintain an angular velocity (w) about some axis perpendicular to v, it must be subjected to a coriolis force ($F_c$) which is perpendicular to both v and w.

The coriolis acceleration can be derived in a straightforward and simple fashion from the time derivitives of the transformation between local rectangular (x,y) and polar (r, $\phi$) coordinate systems as shown in FIG. 2.

$x = r \cos \phi$ $y = r \sin \phi$ $x' = -r\phi' \sin \phi + r' \cos \phi$ $y' = r\phi' \cos \phi + r' \sin \phi$ $x'' = [r'' - r\phi'^2] \cos \phi - [r\phi'' + 2r'\phi'] \sin \phi$ $y'' = [r'' - r\phi'^2] \sin \phi + [r\phi'' + 2r'\phi'] \cos \phi$ The "$2r'\phi'$" component is the coriolis acceleration. Note that it is the product of two velocities, and that it is not a function of the distance (r) from the origin. Thus it must also exist at the origin (r=0), and this helps in understanding how or why the mass flowmeter works. For example, one can visualize a local origin at each point along a tube. As the tube flexes, each point rotates to some extent. If fluid is also flowing through the tube (r'), then this rotation of the tube ($\phi'$) causes a tangetial coriolis acceleration of ($2r'\phi'$).

For fluid flowing from left to right in a tube aligned with the x-axis ($\phi=0$), the coriolis acceleration is in the y-direction and may be written as follows.

$y_c'' = 2V_f \phi'$ where:
y(x,t) = displacement function of the tube
$V_f$ = velocity of the fluid = r'
$\phi$ = dy/dx (partials)
$\phi'$ = d²y/dt dx (partials)

The inertial force exerted on the tube by the coriolis acceleration of the fluid inside the tube for element length dx is as follows.

$F_c = - m_f y_c''$ $\phantom{F_c} = -\rho_f A_f dx 2 V_f \phi'$ $\phantom{F_c} = -\rho_f A_f V_f 2 dx \phi'$ $\phantom{F_c} = -m_f 2 dx \phi'$ ($F_c/dx = -2 m_f \phi'$ (Force per unit length))

This is an unsymmetric relation which is one reason for its utility in this device, i.e., a rotational velocity produces a translational force, but the translational velocity does not produce a rotational force. Thus, if symmetric modes of the mass flowmeter tubes are driven by external means such as electromagnetic shakers, the coriolis forces tend to excite the anti-symmetric modes. Conversely, if anti-symmetric modes are externally driven, the coriolis forces tend to excite the symmetric modes.

If the driving force is sinusoidal, then the tube's displacement, velocity and acceleration will likewise be sinusoidal and vary by 90° and 180° respectively. This allows the phase difference $\phi$ to be equal regardless of whether it is measured relative to the displacement, velocity or acceleration functions of the drive force versus resultant drive force plus the force $-\overline{F}_c$.

SUMMARY OF THE INVENTION

The present invention is drawn to a method and apparatus for measuring mass flow rate.

According to the invention, a pair of parallel conduits are mounted in side-by-side relationship with their ends being fixedly supported. Sensors are provided in the middle of the conduits and between them for producing signals which correspond to the velocity of the tubes at the sensor location.

A drive means is provided including one portion connection to the conduits at a first oscillation portion and a second portion connected to the conduits at a second oscillation portion. The first and second oscillation portions are provided on either side of the sensor and roughly half-way between the sensor and each respective support.

By varying the frequency at which the drive is operated, it is possible to locate and produce the maximum symmetric mode response. This provides natural frequency information which is a function of (among other things) the fluid density. Thus for a given device, the mass flow rate, fluid density, and hence the actual fluid velocity could be ascertained with curves or families of curves generated by analysis, tests and calibrations.

Accordingly, an object of the present invention is to provide an apparatus for measuring mass flow rate of a fluid which comprises a pair of parallel conduits which have opposite ends, a longitudinal axis and a midpoint, support means for supporting the opposite ends at substantially fixed locations and drive means for oscillating portions of the conduits between their opposite ends and in a direction transverse to their axes—the portions are oscillated 180° out of phase with respect to each other. Connector conduit means are provided having a fluid flow rate therethrough, which is to be measured, connected to each of said conduits for providing a substantially equal flow through each. At least one sensor is provided for sensing motion of said conduit at a point adjacent respective conduit midpoints. The movement sensor may either sense displacement, velocity or acceleration.

The various features of novelty which characterize the invention are pointed out with particularity in the claims and annexed to and forming a part of this disclosure. For a better understanding of the invention and its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
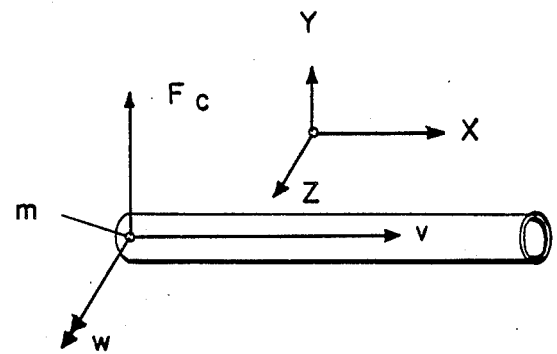
FIG. 1 is a diagram showing a coordinate system in which a conduit for carrying a mass flow can be rotated to illustrate the occurrence of a force $F_c$.
Figure 2:
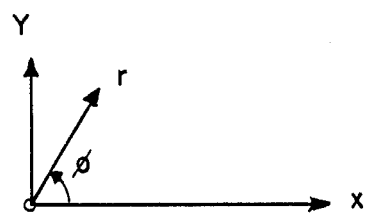
FIG. 2 is a diagram showing local rectangular (x,y) and polar (r,$\phi$) coordinate systems.
Figure 3:
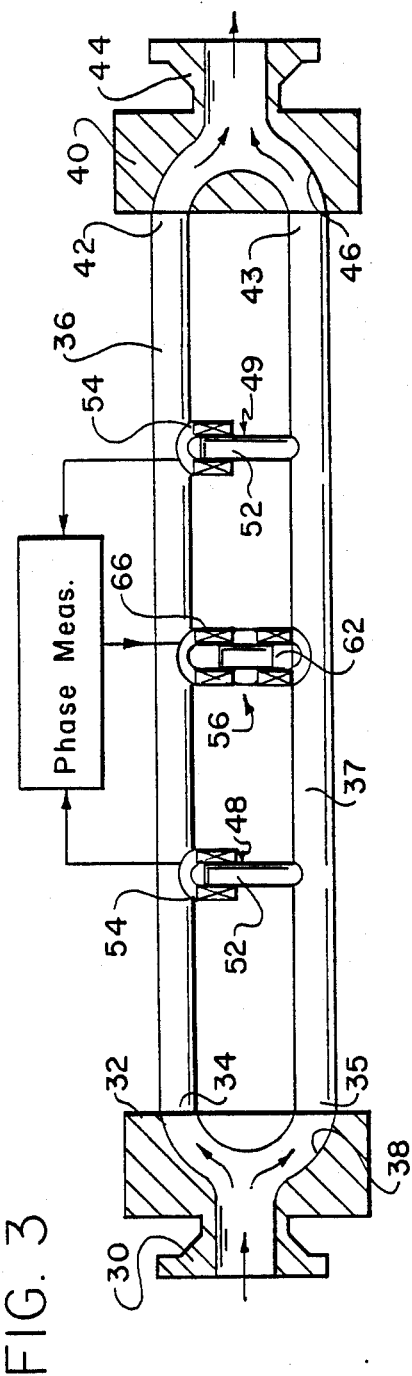
FIG. 3 is a side elevational view of an embodiment of the invention.

Referring to FIG. 3, the invention embodied therein comprises a device for measuring mass flow rates applied to an inlet connection 30. Inlet connection 30 is connected to a first support 32 which fixes ends 34 and 35 of a pair of parallel conduits 36 and 37. A Y-shaped passage 38 is defined in support 32 for dividing the mass flow in connection 30 into two approximately equal parts. Half the mass flow is supplied to conduit 36 and the other half to conduit 37.

Conduits 36 and 37 have opposite ends 42 and 43 respectively which are connected to a second support 40 which carries an outlet connection 44. Another Y-shaped passage 46 is defined in support 40 for combining the flows of conduits 36 and 37 back together and into discharge connection 44.

A driving mechanism including driving portions 48 and 49 is provided so driving portions 48 and 49 connect to oscillation portions of conduits 36 and 37. These oscillation portions lie on opposite sides of the midpoint of respective conduits. Each driving mechanism portion 48 and 49 includes a solenoid coil 54 which is fixed for example, to conduit 36, and a permanent magnet 52 which rides in coil 54 and is fixed to conduit 37. By applying electricity to coil 54 at a selected frequency, conduits 36 and 37 can be made to oscillate toward and away from each other, at the oscillation portions, in an up and down direction.

Tubes 36 and 37 are provided with at least one sensor 56 which is located adjacent the midpoint of the respective tubes 36 and 37. Sensor 56 comprises a permanent magnet 62 which is magnetically coupled to coil 66 which is connected to tubes 37 and 36 respectively.

By oscillating conduits 36 and 37 at oscillation portions of each of the conduits sinusoidal currents are induced in coil 66. These signals are proportional to the velocities of the tubes towards and away from each other at the midpoint of the tubes.

When no fluid is passing through the conduits 36 and 37, the oscillation applied by the driving mechanisms 48 and 49 to the oscillation portions of the tubes 36 and 37 will result in signals in sensor 56 which are a measure of the displacements, velocities, and accelerations at or near the center. This information, is then proportional to the coriolis induced response resulting from the oscillation.

When fluid passes through conduits 36 and 37, a coriolis induced symmetric response will exist. When there is no fluid passing through the conduits there will be no coriolis induced response.

Figure 5:
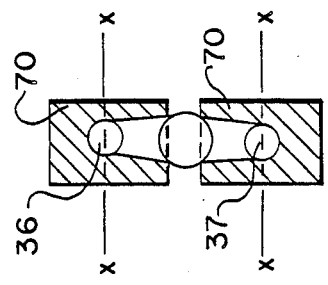
FIG. 5 is a cross-section through line 5—5 of FIG. 4.
Figure 4:
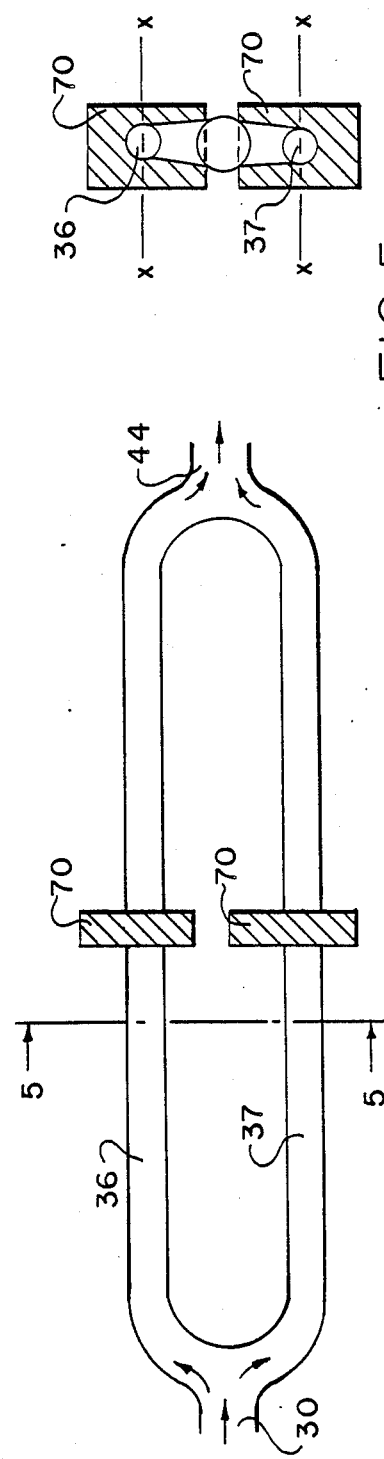
FIG. 4 is a side elevational view of an alternative embodiment of the invention.

FIG. 4 and FIG. 5 are an alternative embodiment of the invention in which a disc or plate 70 is provided and attached to the center of each of the tubes 36 and 37. This alteration has the effect of moving the natural frequencies of the driven anti-symmetric mode and the resultant induced symmetric mode. The mass of the attachments 70 would lower the natural frequency of the driven anti-symmetric mode, but the relatively high mass moment of inertia of the attachment 70 about axis X—X should lower the natural frequency of the resultant induced symmetric mode even further, thus bringing the two natural frequencies closer together. Therefore, the driven and the resultant induced modes could be moved much closer together than they naturally occur, and this would considerably lower the required driving forces of the driving mechanisms 48 and 49 and improve the efficiency and performance of the device. Similarly, it may prove beneficial to make the natural frequencies arbitrarily close or even equal to each other.

While a specific embodiment of the invention has been shown and described in detail to illustrate the application of the principles of the invention, it will be understood that the invention may be embodied otherwise without departing from such principles.

What is claimed is:

1. An apparatus for measuring mass flow of the fluid flow comprising:
   a pair of parallel conduits each having respective opposite ends, a longitudinal axis and a midpoint between its respective opposite ends;
   support means connected to said conduits for holding said opposite ends at substantially fixed positions;
   connecting conduit means having a fluid flow rate therethrough, which is to be measured, connected to each of said conduits for providing a substantially equal flow through each;
   drive means including one portion connected to said conduits at a first oscillation portion, between the midpoint and one of respective said ends and a second oscillation portion connected to said conduits between their midpoints and respective opposite ends, for driving said first oscillation portion in an oscillatory manner at a first frequency and driving said second oscillation portion at the same frequency as the first oscillation portion but in opposition therefrom at the oscillating portions of said conduits; and at least one sensor for sensing motion of said conduits adjacent respective conduit midpoints.

2. A apparatus according to claim 1, wherein each portion of said drive means comprises a solenoid coil connected to said conduit at one of said oscillation portions and a permanent magnet connected to the other of said pair of conduits at a corresponding oscillation portion and movable in said coil, as well as current means connected to said solenoid coil for applying current to said solenoid coil at said selected frequency for oscillating said conduits.

3. An apparatus according to claim 2, wherein said sensor comprises a first sensing coil connected to one of said pair of conduits at the midpoint and a first sensor permanent magnet connected to the other of said pair of parallel conduits at the midpoint.

4. An apparatus according to claim 3, wherein said supported means comprises a first support having an input connector for receiving fluid flow, a Y-shaped passage in said first support connected between said input connector and first ends of each conduit for dividing flow between said conduits.

5. An apparatus according to claim 4, wherein said support means further comprises a second support having an output connection for receiving fluid flow from said conduits and a further Y-shaped passage defined in said second support connected between second ends of said conduits and said output connector.

6. A method for measuring mass flow rate of a fluid flow using a conduit having a fluid flow therethrough and first and second additional conduits of substantially equal length, fixed at their ends and each having midpoints intermediate respective ends, the method comprising the steps of:

transversely oscillating a first oscillation portion, between respective midpoints and one of said respective ends, at a selected frequency;

transversely oscillating a second oscillation portion, between respective midpoints and respective opposite ends, at the frequency that said first oscillation portion is oscillated and out of phase therefrom;

passing about one-half of a fluid flow, having a mass flow rate which is to be measured, through each of the conduits; and sensing motion of each conduit at a first sensing location proximate the midpoints of the conduits the motion of each conduit corresponding to the mass flow rate of the fluid flow.

* * * * *

UNITED STATES PATENT AND TRADEMARK OFFICE
CERTIFICATE OF CORRECTION

PATENT NO. : 4,703,660

DATED : November 3, 1987

INVENTOR(S) : Benjamin Brenneman

It is certified that error appears in the above-identified patent and that said Letters Patent is hereby corrected as shown below:

In Col. 1, line 33, immediately following "Y,", kindly insert --and Z--.

Signed and Sealed this

Twenty-fourth Day of April, 1990

Attest:

HARRY F. MANBECK, JR.

*Attesting Officer*  *Commissioner of Patents and Trademarks*